No. 749,402. PATENTED JAN. 12, 1904.
W. ROST.
GUN BARREL.
APPLICATION FILED NOV. 15, 1902.
NO MODEL.
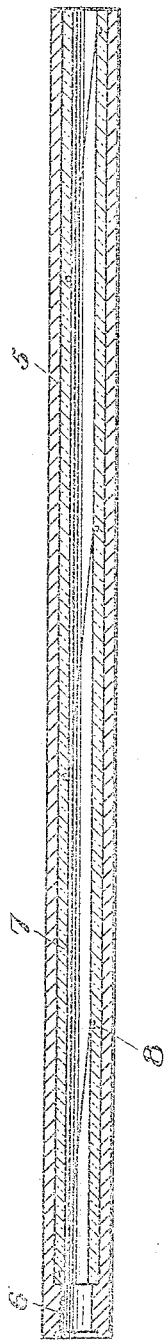
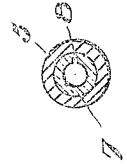
Witnesses
Inventor
W. Rost,
By
Attorneys No. 749,402. Patented January 12, 1904.

UNITED STATES PATENT OFFICE.

WILLIE ROST, OF GILMORE CITY, IOWA.

GUN-BARREL.

SPECIFICATION forming part of Letters Patent No. 749,402, dated January 12, 1904.

Application filed November 15, 1902. Serial No. 131,534. (No model.)

*To all whom it may concern:*

Be it known that I, WILLIE ROST, a citizen of the United States, residing at Gilmore City, in the county of Pocahontas, State of Iowa, have invented certain new and useful Improvements in Rifles; and I do hereby declare the following to be a full, clear, and exact description of the invention, such as will enable others skilled in the art to which appertains to make and use the same.

This invention relates to guns, and more particularly to the barrels thereof; and it has for its object to provide a barrel which will not rust, which will be durable, and which may be easily cleaned, other objects and advantages of the invention being understood from the following description.

In the drawings forming a portion of this specification, and in which like numerals of reference indicate similar parts in the several views, Figure 1 is a section taken longitudinally through a gun-barrel involving the present invention. Fig. 2 is a transverse section through the gun-barrel.

Referring now to the drawings, there is shown a gun-barrel comprising an outer shell 5 of usual gun-metal and which shell may be cylindrical or octagonal or may have any other desired exterior shape. The bore of the barrel at the rear end thereof is increased in diameter, as shown at 6, to form the firing-chamber, in which the shell of the cartridge is received, and from the forward end of the firing-chamber to the muzzle of the barrel is a lining 7 of glass, said lining having any desired thickness and being of the requisite toughness, the position of this glass lining being such that in the discharge of the gun the products of combustion do not come in contact with any metal surface, but only with the interior of the glass lining. The glass lining is rifled throughout its length, as shown at 8, so as to give to the projectile the proper rotation.

It will be understood that any suitable system of rifling may be adopted and that the lining may be applied to guns of different bores and other dimensions and that modifications of the specific construction shown may be made without departing from the spirit of the invention.

It will be understood that the use of the present barrel is not confined to firearms, but may be employed in pneumatic guns.

What is claimed is—

1. A barrel for guns having a glass lining.
2. A barrel for guns having a glass lining, said lining being rifled.

In testimony whereof I affix my signature in presence of two witnesses.

WILLIE ROST.

Witnesses:
WM. WEIGERT,
OTTO CHRISTOFFERS.